(12) United States Patent
Okazaki

(10) Patent No.: US 11,292,297 B2
(45) Date of Patent: Apr. 5, 2022

(54) PNEUMATIC TIRE

(71) Applicant: BRIDGESTONE CORPORATION, Tokyo (JP)

(72) Inventor: Naoto Okazaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 250 days.

(21) Appl. No.: 16/616,004

(22) PCT Filed: May 9, 2018

(86) PCT No.: PCT/JP2018/017931
§ 371 (c)(1),
(2) Date: Nov. 22, 2019

(87) PCT Pub. No.: WO2018/221141
PCT Pub. Date: Dec. 6, 2018

(65) Prior Publication Data
US 2020/0079156 A1  Mar. 12, 2020

(30) Foreign Application Priority Data

Jun. 1, 2017  (JP) .............................. JP2017-109037

(51) Int. Cl.
*B60C 11/13* (2006.01)
*B60C 11/03* (2006.01)

(52) U.S. Cl.
CPC ...... *B60C 11/1307* (2013.01); *B60C 11/0323* (2013.01); *B60C 2011/1338* (2013.01)

(58) Field of Classification Search
CPC . B60C 11/1307; B60C 11/042; B60C 11/045; B60C 2011/0344;
(Continued)

(56) References Cited

U.S. PATENT DOCUMENTS 2,121,871 A * 6/1938 Havens ................. B60C 11/042
152/209.21
2015/0251496 A1* 9/2015 Yamaguchi ............... B60C 5/12
152/209.18
(Continued)

FOREIGN PATENT DOCUMENTS

CN          103370211 A     10/2013
EP           3308977 A1      4/2018
(Continued)

OTHER PUBLICATIONS

English machine translation of JP09-22632. (Year: 1997).*
(Continued)

*Primary Examiner* — Robert C Dye
(74) *Attorney, Agent, or Firm* — Oliff PLC

(57) ABSTRACT

A pneumatic tire includes rib-shaped land parts adjacent to each other with a circumferential groove therebetween, and raised-row-shaped projections projecting toward each other from both mutually opposed side wall surfaces of the adjacent rib-shaped land parts are provided to extend in the tread circumferential direction. As compared to a raised-row-shaped projection in an outermost-side circumferential groove located on a tire width direction outermost side, a raised-row-shaped projection in an inner adjacent circumferential groove located on tire width direction inner side of and adjacent to the outermost-side circumferential groove is formed at a shallower position near a tread surface between the tread surface and the groove bottom. As a result, it is possible to obtain suitable drainage properties according to the tire width direction positions of the circumferential grooves, while restraining an increase in rolling resistance, and to realize improved wet grip performance owing to an enlarged grounding area.

7 Claims, 3 Drawing Sheets

(58) Field of Classification Search
CPC ..... B60C 2011/0355; B60C 2011/1338; B60C 2011/133
See application file for complete search history.

(56) References Cited

U.S. PATENT DOCUMENTS

2016/0318348 A1\* 11/2016 Cambon ............. B60C 11/1307
2020/0070586 A1\* 3/2020 Ocana Amezcua ... B60C 11/047

FOREIGN PATENT DOCUMENTS

| | | | |
|---|---|---|---|
| JP | 09-226323 | \* | 9/1997 |
| JP | 2008-114824 | A | 5/2008 |
| JP | 2012-086599 | A | 5/2012 |
| JP | 2016-88288 | A | 5/2016 |
| WO | 2015/086622 | A1 | 6/2015 |

OTHER PUBLICATIONS

Aug. 14, 2018 International Search Report issued in International Patent Application No. PCT/JP2018/017931.
Nov. 27, 2020 Search Report issued in European Patent Application No. 18809867.7.
"Health and Safe Driving Technics, 185 Question"; First Edition; pp. 223-228.
Mar. 9, 2021 Office Action issued in Chinese Patent Application No. 201880035529.3.

\* cited by examiner

PNEUMATIC TIRE

TECHNICAL FIELD

The present invention relates to a pneumatic tire in which a plurality of rib-shaped land parts is formed by a plurality of circumferential grooves, particularly to a tread structure of a tire.

BACKGROUND ART

A pneumatic tire in which a tread is provided with a plurality of circumferential grooves to configure a rib pattern promotes drainage by the circumferential grooves even on a wet road, to thereby secure a frictional force (wet grip performance).

However, when the rib-shaped land parts partitioned by the circumferential grooves are grounded and elastic deformation, such as compressive e deformation or bending, of the rib-shaped land parts is thereby generated, the tread section generates heat because of lost energy due to hysteresis loss generated by the deformation, whereby rolling resistance tends to be increased.

In consideration of this problem, there has been proposed an example in which raised-row-shaped projections are projected toward each other from the rib-shaped land parts adjacent to each other with the circumferential groove therebetween, such that, when the rib-shaped land parts are grounded, the mutually opposed raised-row-shaped projections contact and support each other, to thereby maintain rigidity of the rib-shaped land parts and to restrain deformation of the latter (see, for example, Patent Document 1).

PRIOR ART DOCUMENT

Patent Document

Patent Document 1: JP 2016-88288 A

In the circumferential grooves extended in the tread circumferential direction of the pneumatic tire described in Patent Document 1, raised-row-shaped projections are formed at an intermediate depth position of the groove between the tread surface and the groove bottom. When the rib-shaped land parts are grounded, the intermediate depth portions of mutually opposed groove wall surfaces of the rib-shaped land parts are put into elastic deformation of swelling toward each other, whereby the mutually opposed raised-row-shaped projections are put into contact with each other, to restrain the deformation and restrain an increase in rolling resistance. In addition, an outer-side groove space is formed on the outer circumferential side of the mutually opposed raised-row-shaped projections, and, therefore, a drainage property can be maintained by the outer-side groove space, and wet grip performance can be secured.

SUMMARY OF INVENTION

Underlying Problems to be Solved by the Invention

The pneumatic tire disclosed in Patent Document 1 is formed with four circumferential grooves. Every one of the four circumferential grooves is provided with projections (raised-row-shaped projections) projecting toward each other from the land parts adjacent to each other with the circumferential groove therebetween. The projection in every one of the circumferential grooves is formed at an intermediate depth position of the groove between the tread surface and the groove bottom.

In a pneumatic tire, there is a traveling growth phenomenon in which the tire outside diameter gradually increases attendant on the traveling of the vehicle. In the traveling growth, the outside diameter at the outermost-side circumferential groove on the tire width direction outermost side grows fastest, and, therefore, a footprint P as depicted in FIG. 6 is formed when the tire is a new article.

The footprint P illustrated in FIG. 6 is a footprint of the pneumatic tire according to an embodiment of the present invention to be described later, and description will be made below utilizing this footprint P.

The pneumatic tire that forms this footprint P is an example having a total of five circumferential grooves (see FIGS. 1 and 2), including one equator circumferential groove on a tire equator line Lc, two outermost-side circumferential grooves located on tire width direction outermost sides, and two inner adjacent circumferential grooves located on the tire width direction inner sides of and adjacent to the outermost-side circumferential grooves. In the footprint P, as depicted in FIG. 6, one equator circumferential groove mark Mc, two outermost-side circumferential groove marks Ms, and two inner adjacent circumferential groove marks Mn are printed.

As depicted in FIG. 6, in the footprint P when the tire is a new article, the equator circumferential groove mark Mc and both outer side part marks of the tire are the longest in front-rear length, the outermost-side circumferential groove marks Ms therebetween are the shortest in front-rear length, and a front end edge Ef and a rear end edge Er of the footprint P are wavy in shape, so that the footprint P is in a butterfly shape as a whole.

When a vehicle travels on a wet road surface, a front end edge (corresponding to the front end edge Ef of the footprint) of a tire grounding surface acts to drive water forward, so that water is most liable to collect in left and right recesses Vs, Vs where the outermost-side circumferential groove marks Ms of the wavy front end edge Ef are located, and water is liable to collect also on a front side Vc of a central projection located at the equator circumferential groove mark Mc.

While the outermost-side circumferential grooves are required to have a high drainage property, the inner adjacent circumferential grooves are not required to have a high drainage property. In the pneumatic tire according to Patent Document 1, every one of the four circumferential grooves is formed with the projections at an intermediate depth position of the groove between the tread surface and the groove bottom, and an outer-side groove space is formed on the outer circumferential side of the projections to be sufficient in internal volume, whereby a high drainage property is secured.

Therefore, this structure is suitable for the outermost-side circumferential grooves required to have a high drainage property but has a more-than-required drainage property with respect to the inner adjacent circumferential grooves not required to have a high drainage property.

The present invention has been made in consideration of the above-mentioned points. It is an object of the present invention to provide a pneumatic tire that has suitable drainage properties according to the tire width direction positions of circumferential grooves and that is able to realize improved wet grip performance owing to an enlarged grounding area, while restraining an increase in rolling resistance.

Means to Solve the Problems

In order to achieve the above object, the present invention provides:

a pneumatic tire having a plurality of rib-shaped land parts formed by at least four circumferential grooves extended in a tread circumferential direction, in which raised-row-shaped projections from both opposed side wall surfaces of the rib-shaped land parts adjacent to each other with the circumferential groove therebetween are provided while directed in directions toward each other, the raised-row-shaped projections being formed such as to extend in the tread circumferential direction, the mutually opposed raised-row-shaped projections have spacing from a bottom of the circumferential groove, mutually facing tip surfaces of the raised-row-shaped projections being disposed with spacing therebetween such that the tip surfaces contact each other due to elastic deformation of the grounding rib-shaped land parts when the tire is grounded, and the circumferential grooves include outermost-side circumferential groove sections located on tire width direction outermost sides and inner adjacent circumferential grooves located on tire width direction inner sides of and adjacent to the outermost-side circumferential groove sections, the raised-row-shaped projection in the inner adjacent circumferential groove being formed at a shallower position of the circumferential groove near a tread surface between the tread surface and a bottom of the circumferential groove as compared to the raised-row-shaped projection in the outermost-side circumferential groove.

According to this configuration, the raised-row-shaped projections in the outermost-side circumferential groove located on the tire width direction outermost sides of the circumferential grooves are formed at a depth position of the groove between the tread surface and the groove bottom. When the rib-shaped land parts are grounded, therefore, the mutually opposed raised-row-shaped projections contact and support each other, thereby to restrain deformation of the rib-shaped land parts and to restrain an increase in rolling resistance. In addition, an outer-side groove space is formed on the outer circumferential side of the raised-row-shaped projections to be sufficient in internal volume, providing a high drainage property, whereby the water collecting in recesses on the front side of the outermost-side circumferential grooves can be efficiently drained, and wet grip performance can be kept high.

On the other hand, the raised-row-shaped projection in the inner adjacent circumferential groove located on the tire width direction inner side of and adjacent to the outermost-side circumferential groove is formed at a shallower position near the tread surface of the groove between the tread surface and the groove bottom as compared to the raised-row-shaped projection in the outermost-side circumferential groove. When the rib-shaped land parts are grounded, therefore, the mutually opposed raised-row-shaped projections contact and support each other, thereby restraining an increase in rolling resistance. In addition, although the raised-row-shaped projections are formed at a shallow position and the drainage property is not high, a required drainage property is secured, since water is not liable to collect on the front side of the inner adjacent circumferential grooves. Besides, it is highly possible for the raised-row-shaped projections formed at a shallow position near the tread surface to be grounded, so that it is possible to realize improved wet grip performance owing to an enlarged grounding area.

In other words, an increase in rolling resistance is restrained by both the outermost-side circumferential grooves and the inner adjacent circumferential grooves, efficient drainage is conducted mainly by the outermost-side circumferential grooves, and wet grip performance as a whole can be improved.

According to one embodiment of the present invention, the raised-row-shaped projection in the outermost-side circumferential groove is located at an intermediate depth of the circumferential groove between the tread surface and the groove bottom, and is formed at a deeper position on the groove bottom side as compared to a radial-direction inner circumferential surface of the raised-row-shaped projection in the inner adjacent circumferential groove.

According to this configuration, the raised-row-shaped projection in the outermost-side circumferential groove is located at an intermediate depth of the groove between the tread surface and the groove bottom, and is formed at a deeper position of the groove on the groove bottom side as compared to the inner circumferential surface of the raised-row-shaped projection in the inner adjacent circumferential groove. Therefore, until wear of the tread surface reaches the raised-row-shaped projections formed at a shallow position in the inner adjacent circumferential groove and further before the raised-row-shaped projections are lost, the inner adjacent circumferential groove is closed with the mutually contacting raised-row-shaped projections, but the outer-side groove space is still remaining on the outer circumferential side of the outermost-side circumferential groove, so that drainage can be maintained. In addition, after the raised-row-shaped projections in the inner adjacent circumferential grooves are lost, a groove space is opened in the inner adjacent circumferential groove, so that drainage is secured even if the outermost-side circumferential groove is closed with the raised-row-shaped projections.

In other words, from the time when the tire is a new article until the tire is completely worn, a drainage property is secured by at least one of the outermost-side circumferential grooves and the inner adjacent circumferential grooves, and wet grip performance can be maintained.

Here, that intermediate depth of the groove between the tread surface and the groove bottom at which the raised-row-shaped projection is located means a depth such that the distance from the tread surface to the raised-row-shaped projection and the distance from the raised-row-shaped projection to the groove bottom are substantially equal.

In addition, before the raised-row-shaped projections in the inner adjacent circumferential grooves are substantially lost by wearing, rigidity of the rib-shaped land parts is secured by the raised-row-shaped projections in the outermost-side circumferential grooves and the inner adjacent circumferential grooves, and an increase in rolling resistance can be restrained.

Note that after the raised-row-shaped projections in the inner adjacent circumferential grooves are lost, rigidity of the rib-shaped land parts is not lowered considerably, since the projection length (height) of the rib-shaped land parts on both sides of the inner adjacent circumferential groove from the groove bottom has become small, and an increase in rolling resistance is appropriately restrained.

In a preferred embodiment of the present invention, the raised-row-shaped projection in the inner adjacent circumferential groove is formed in a state of being divided into a plurality of portions at intervals in the tread circumferential direction.

According to this configuration, since the raised-row-shaped projection in the inner adjacent circumferential groove is formed in the state of being divided into a plurality of portions at intervals in the tread circumferential direction, the raised-row-shaped projection formed at a shallow position of the groove in the inner adjacent circumferential groove cannot be expected to have a high drainage property due to the small internal volume of the outer-side groove space on the outer circumferential side of the raised-row-shaped projection. With the raised-row-shaped projection formed in the state of being divided into a plurality of portions at intervals in the tread circumferential direction, however, the drainage property can be improved, and, by draining the water present on the front side of the inner adjacent circumferential groove, the water is somewhat restrained from flowing toward the outermost-side circumferential groove. As a result, burden in drainage by the outermost-side circumferential groove is alleviated, drainage is effectively shared, and wet grip performance as a whole can be improved.

In a preferred embodiment of the present invention, the raised-row-shaped projection in the outermost-side circumferential groove is formed continuously in the tread circumferential direction.

According to this configuration, since the raised-row-shaped projection in the outermost-side circumferential groove is formed continuously in the tread circumferential direction, it is ensured that, when the rib-shaped land parts are grounded, the mutually opposed raised-row-shaped projections contact each other continuously and support each other firmly. As a result, deformation of the rib-shaped land parts can be restrained as much as possible, and an increase in rolling resistance can be restrained securely.

In a preferred embodiment of the present invention, the circumferential grooves include an equator circumferential groove located at a tire equator line in a tire width direction center, and the raised-row-shaped projections in the equator circumferential groove are located at an intermediate depth position of the groove between a tread surface and a groove bottom.

According to this configuration, since the raised-row-shaped projections in the equator circumferential groove located at the tire equator line are formed at an intermediate depth position of the groove between the tread surface and the groove bottom, it is ensured that, when the rib-shaped land parts are grounded, the mutually opposed raised-row-shaped projections contact and support each other, thereby to restrain deformation of the rib-shaped land parts and to restrain an increase in rolling resistance. In addition, the outer-side groove space is formed on the outer circumferential side of the raised-row-shaped projections to be sufficient in internal volume, providing high drainage properties, and thus the water collecting on the front side of the equator circumferential groove can be efficiently drained, the water is restrained from flowing toward the inner adjacent circumferential groove and outermost-side circumferential groove. As a result, burden in drainage by the outermost-side circumferential groove is alleviated, drainage is effectively shared, and wet grip performance as a whole over the entire area in the tire width direction can be improved.

In a preferred embodiment of the present invention, the raised-row-shaped projection in the equator circumferential groove is formed continuously in the tread circumferential direction.

According to this configuration, since the raised-row-shaped projections in the equator circumferential groove are formed continuously in the tread circumferential direction, it is ensured that, when the rib-shaped land parts are grounded, the mutually opposed raised-row-shaped projections contact each other continuously and support each other firmly. As a result, deformation of the rib-shaped land parts can be restrained as much as possible, and an increase in rolling resistance can be restrained securely.

In a preferred embodiment of the present invention, the raised-row-shaped projection in the equator circumferential groove is formed at a deeper position on the groove bottom side as compared to the radial-direction inner circumferential surface of the raised-row-shaped projection in the inner adjacent circumferential groove.

According to this configuration, the raised-row-shaped projection in the equator circumferential groove is formed at a deeper position on the groove bottom side as compared to the radial-direction inner circumferential surface of the raised-row-shaped projection in the inner adjacent circumferential groove. Therefore, until wear of the tread surface reaches the raised-row-shaped projections formed at a shallow position in the inner adjacent circumferential groove and further before the raised-row-shaped projections are lost, the inner adjacent circumferential groove is closed with the mutually contacting raised-row-shaped projections, but an outer-side groove space is still remaining on the outer circumferential side of the raised-row-shaped projections in the equator circumferential groove, whereby drainage can be maintained. After the raised-row-shaped projections in the inner adjacent circumferential groove are lost, a groove space is opened in the inner adjacent circumferential groove, and, therefore, drainage is secured even if the equator circumferential groove is closed with the raised-row-shaped projections.

In other words, from the time when a tire is a new article until the tire is completely worn, a drainage property is secured by at least one of the equator circumferential groove and the inner adjacent circumferential grooves, and wet grip performance can be maintained.

In addition, before the raised-row-shaped projections in the inner adjacent circumferential grooves are substantially lost by wearing, rigidity of the rib-shaped land parts is secured by the raised-row-shaped projections in the equator circumferential groove and the inner adjacent circumferential grooves, and an increase in rolling resistance can be restrained.

Note that after the raised-row-shaped projections in the inner adjacent circumferential grooves are lost, rigidity of the rib-shaped land parts is not lowered considerably, since the projection length (height) of the rib-shaped land parts on both sides of the inner adjacent circumferential groove from the groove bottom has become small, and an increase in rolling resistance can be restrained appropriately.

In a preferred embodiment of the present invention, a belt layer is embedded in a tread section formed with the circumferential grooves, the belt layer being configured by stacking only a plurality of inclined belts whose cords are directed in a direction inclined relative to a tire equator line, and the outermost-side circumferential groove is located at a position within the width in tire width direction of the belt layer.

According to this configuration, the belt layer embedded in the tread section formed with the circumferential grooves is configured by stacking a plurality of inclined belts whose cords are directed in a direction inclined relative to the tire equator line, and the outermost-side circumferential groove is located at a position within the width in the tire width direction of the belt layer. Therefore, the footprint when the tire is a new article is a typical butterfly shape, such that the footprint upon traveling growth will be a rectangular shape.

The configuration in which the raised-row-shaped projection in the inner adjacent circumferential groove is formed at a shallower position near the tread surface of the groove between the tread surface and the groove bottom as compared to the raised-row-shaped projection in the outermost-side circumferential groove, is most suitable for a pneumatic tire whose footprint when the tire is a new article is a typical butterfly shape. As a result, the effect to efficiently drain the water collecting on the front side of the outermost-side circumferential grooves while restraining an increase in rolling resistance and the effect to realize improved wet grip performance through an enlarged grounding area can be produced more remarkably.

Advantageous Effects of the Invention

According to the present invention, the raised-row-shaped projection in the inner adjacent circumferential groove is formed at a shallower position near the tread surface between the tread surface and the groove bottom as compared to the raised-row-shaped projection in the outermost-side circumferential groove. Therefore, it is possible to improve wet grip performance by efficiently draining the water collecting on the front side of the outermost-side circumferential grooves while restraining an increase in rolling resistance, and to realize improved grip performance through an enlarged grounding area at the inner adjacent circumferential grooves.

MODE FOR CARRYING OUT THE INVENTION

A pneumatic tire according to an embodiment of the present invention will be described below, based on the drawings.

Figure 1:
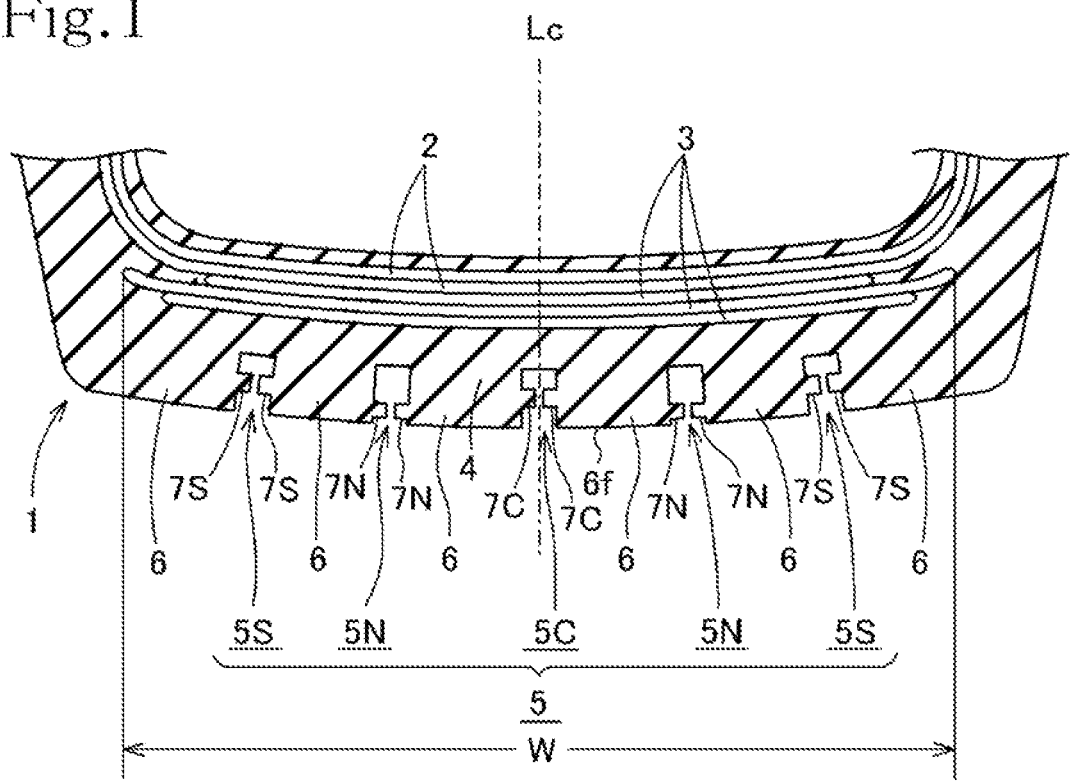
FIG. 1 is a width-direction sectional view (a sectional view taken along line I-I of FIG. 2) of a pneumatic tire of an embodiment of the present invention.
Figure 2:
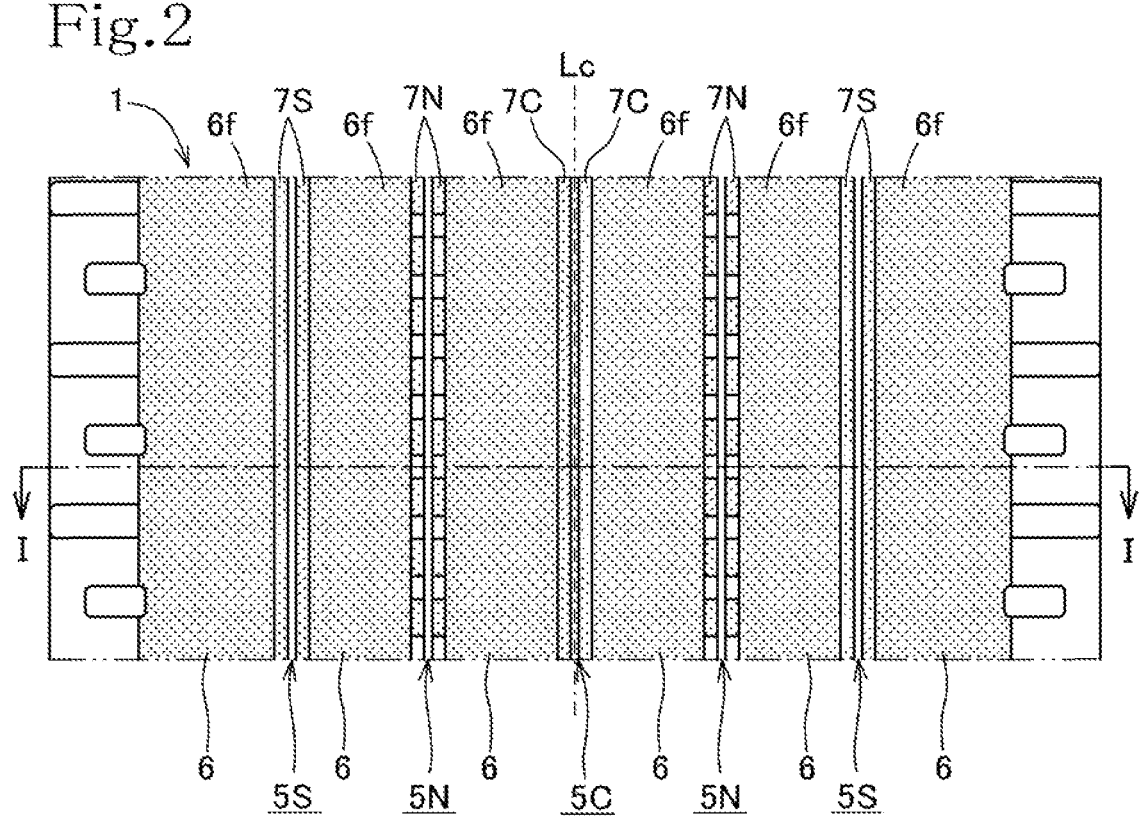
FIG. 2 is a partial plan view in a circumferential direction of the pneumatic tire.

FIG. 1 is a width-direction partial sectional view of a pneumatic tire 1, and FIG. 2 is a partial plan view in a circumferential direction of the pneumatic tire.

Referring to FIG. 1, the pneumatic tire 1 has a configuration in which carcass 2 which is rubber-coated layers of plies extending in a radial direction is formed in a toroidal shape between a pair of bead cores (not illustrated), and a tread 4 is formed on a tire radial-direction outer side of a crown part of the carcass 2, with a plurality of belt layers 3 interposed therebetween.

Note that the carcass 2 illustrated in FIG. 1 is composed of two layers, but it may be composed of one layer.

The belt layers 3 are configured by stacking only a plurality of inclined belts whose cords are directed in a direction inclined relative to the tire equator line Lc.

The tread 4 is provided with a rib pattern in which six rib-shaped land parts (parts provided with dotted pattern in FIG. 1) 6 are formed by five circumferential grooves 5 extending in a tread circumferential direction.

One equator circumferential groove 5C is formed located on the tire equator line Lc in a tread width direction center, two outermost-side circumferential grooves 5S are formed located on left and right outermost sides in the tire width direction, and two inner adjacent circumferential grooves 5N are formed located on the tire width-direction inner side of and adjacent to the outermost-side circumferential grooves 5S.

As depicted in FIG. 1, the outermost-side circumferential grooves 5S are located within a width W in the tire width direction of the belt layers 3.

In the outermost-side circumferential groove 5S, raised-row-shaped projections 7S, 7S projecting toward each other from both mutually opposed side wall surfaces of the adjacent rib-shaped land parts 6, 6 are formed extending in the tread circumferential direction.

The raised-row-shaped projection 7S is formed in an annular shape continuously in the tread circumferential direction.

A gap is present between mutually facing tip surfaces of the mutually opposed raised-row-shaped projections 7S, 7S, the gap being set to such a gap that the tip surfaces of the mutually opposed raised-row-shaped projections 7S, 7S come closer to and contact each other due to elastic deformation of the grounding rib-shaped land parts 6, 6 when the tire is grounded.

Figure 3:
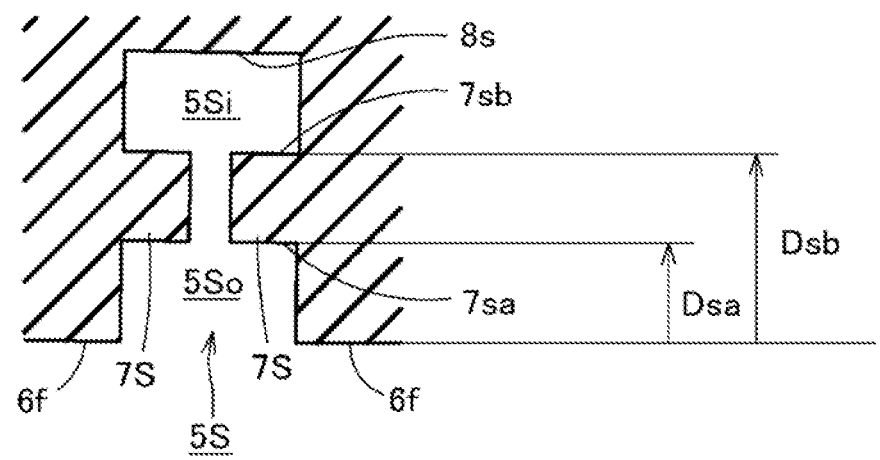
FIG. 3 is an enlarged sectional view in the width direction of an outermost-side circumferential groove.

Referring to FIG. 3, the raised-row-shaped projection 7S in the outermost-side circumferential groove 5S is formed at an intermediate depth position of the groove between a tread surface 6f and a groove bottom 8s.

Of the raised-row-shaped projection 7S in the outermost-side circumferential groove 5S, the depth from the tread surface 6f to a radial-direction outer circumferential surface 7sa of the raised-row-shaped projection 7S is Dsa, the depth to a radial-direction inner circumferential surface 7sb of the raised-row-shaped projection 7S is Dsb, and the raised-row-shaped projection 7S is formed at an intermediate depth position between the depth Dsa and the depth Dsb.

Therefore, the outermost-side circumferential groove 5S is divided by the mutually opposed raised-row-shaped projections 7S, 7S into an outer-side groove space 5So on the outer circumferential side as compared to outer circumferential surfaces 7sa, 7sa of the raised-row-shaped projections 7S, 7S, and an inner-side groove space 5Si on the inner circumferential side as compared to inner circumferential surfaces 7sb, 7sb of the raised-row-shaped projections 7S, 7S.

The outer-side groove space 5So has an internal volume substantially equal to that of the inner-side groove space 5Si, and has an internal volume sufficient for obtaining a good drainage property.

In the inner adjacent circumferential groove 5N located on the tire width-direction inner side of and adjacent to the outermost-side circumferential groove 5S, a plurality of raised-row-shaped projections 7N, 7N projecting toward each other from both mutually opposed side wall surfaces of the adjacent rib-shaped land parts 6, 6 is formed extending in the tread circumferential direction.

The plurality of raised-row-shaped projections 7N is formed at intervals in the tread circumferential direction, and each of the raised-row-shaped projections 7N is arcuate in shape.

A gap is present between mutually facing tip surfaces of the mutually opposed raised-row-shaped projections 7N, 7N, the gap being set to such a gap that the tip surfaces of the mutually opposed raised-row-shaped projections 7N, 7N come closer to and contact each other due to elastic deformation of the grounding rib-shaped land parts 6, 6 when the tire is grounded.

As seen from FIG. 1, as compared to the raised-row-shaped projection 7S in the outermost-side circumferential groove 5S, the raised-row-shaped projection 7N in the inner adjacent circumferential groove 5N is formed at a shallower position near the tread surface 6f of the groove between the tread surface 6f and the groove bottom 8s.

Figure 4:
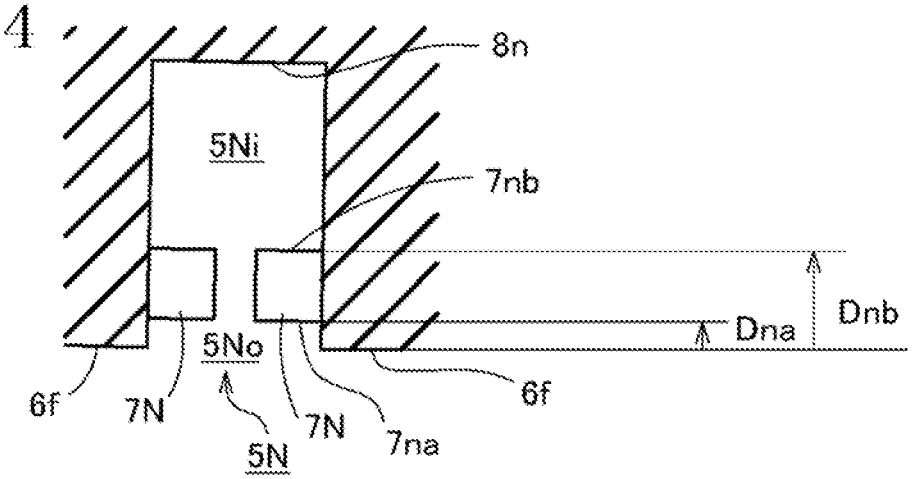
FIG. 4 is an enlarged sectional view in the width direction of an inner adjacent circumferential groove.

Referring to FIG. 4, of the raised-row-shaped projection 7N in the inner adjacent circumferential groove 5N, the depth from the tread surface 6f to a radial-direction outer circumferential surface 7na of the raised-row-shaped projection 7N is an extremely shallow Dna, the depth to a radial-direction inner circumferential surface 7nb of the raised-row-shaped projection 7N is Dnb, and the raised-row-shaped projection 7N is formed at a shallow position near the tread surface 6f of the groove between the depth Dna and the depth Dnb.

Therefore, the inner adjacent circumferential groove 5N is divided by the mutually opposed raised-row-shaped projections 7N, 7N into an outer-side groove space 5No on the outer circumferential side of the outer circumferential surfaces 7na, 7na of the raised-row-shaped projections 7N, 7N, and an inner-side groove space 5Ni on the inner circumferential side of the inner circumferential surfaces 7nb, 7nb of the raised-row-shaped projections 7N, 7N.

Since the depth Dna to the outer circumferential surfaces 7na, 7na of the raised-row-shaped projections 7N, 7N is shallow, the outer-side groove space 5No occupies a small internal volume.

Figure 5:
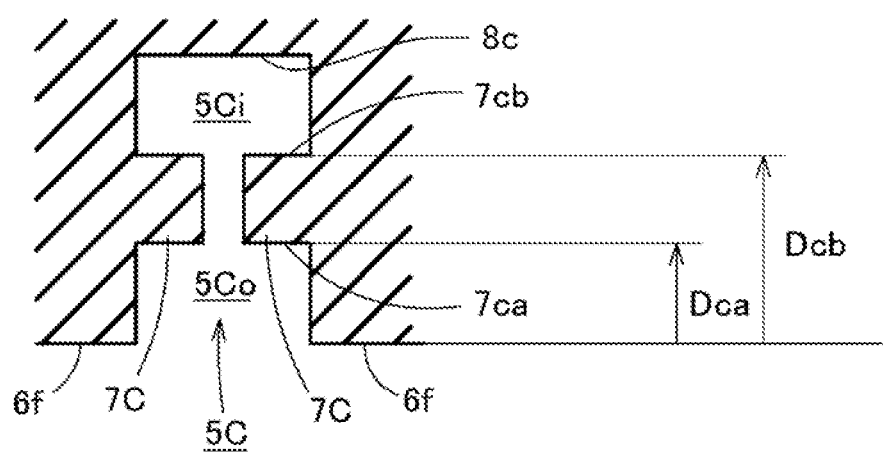
FIG. 5 is an enlarged sectional view in the width direction of an equator circumferential groove.

As illustrated in FIG. 5, as for a raised-row-shaped projection 7C in the equator circumferential groove 5C, raised-row-shaped projections 7C, 7C projecting toward each other from both mutually opposed side wall surfaces of the adjacent rib-shaped land parts 6, 6 are formed extending in the tread circumferential direction.

As depicted in FIG. 2, the raised-row-shaped projection 7C is formed in an annular shape continuously in the tread circumferential direction.

A gap is present between the mutually facing tip surfaces of the mutually opposed raised-row-shaped projections 7C, 7C, the gap being set to such a gap that the tip surfaces of the mutually opposed raised-row-shaped projections 7C, 7C come closer to and contact each other due to elastic deformation of the grounding rib-shaped land parts 6, 6 when the tire is grounded.

Referring to FIG. 5, similarly to the raised-row-shaped projection 7S in the outermost-side circumferential groove 5S, the raised-row-shaped projection 7C in the equator circumferential groove 5C is formed at an intermediate depth position of the groove between the tread surface 6f and a groove bottom 8c.

Of the raised-row-shaped projection 7C in the equator circumferential groove 5C, the depth from the tread surface 6f to an outer circumferential surface 7ca of the raised-row-shaped projection 7C is Dca, the depth to an inner circumferential surface 7cb of the raised-row-shaped projection 7C is Dcb, and the raised-row-shaped projection 7C is formed at an intermediate depth position between the depth Dca and the depth Dcb.

Therefore, the equator circumferential groove 5C is divided by the mutually opposed raised-row-shaped projection 7C, 7C into an outer-side groove space 5Co on the outer circumferential side of outer circumferential surfaces 7ca, 7ca of the raised-row-shaped projections 7C, 7C, and an inner-side groove space 5Ci on the inner circumferential side of inner circumferential surfaces 7cb, 7cb of the raised-row-shaped projections 7C, 7C.

The outer-side groove space 5Co has an internal volume substantially equal to that of the inner-side groove space 5Ci, and has an internal volume sufficient for obtaining a good drainage property.

The raised-row-shaped projection 7S in the outermost-side circumferential groove 5S is located at an intermediate depth of the groove between the tread surface 6f and the groove bottom 8s, and is formed at a deeper position of the groove on the groove bottom 8s side as compared to the inner circumferential surface 7nb of the raised-row-shaped projection 7N in the inner adjacent circumferential groove 5N.

In other words, there is the following relation.

$Dsa$(the depth of the outer circumferential surface 7sa of the raised-row-shaped projection 7S)>$Dnb$(the depth of the inner circumferential surface 7nb of the raised-row-shaped projection 7N)

Similarly, the raised-row-shaped projection 7C in the equator circumferential groove 5C is formed at a deeper position of the groove on the groove bottom 8c side as compared to the inner circumferential surface 7nb of the raised-row-shaped projection 7N in the inner adjacent circumferential groove 5N.

In other words, there is the following relation.

$Dca$(the depth of the outer circumferential surface 7ca of the raised-row-shaped projection 7C)>$Dnb$(the depth of the inner circumferential surface 7nb of the raised-row-shaped projection 7N)

As illustrated in FIG. 1, of the pneumatic tire 1 according to the present embodiment, the belt layers 3 circumferentially provided on the tire radial-direction outer side of the crown section of the carcass 2 are composed only of a plurality of inclined belts whose cords are directed in a direction inclined relative to the tire equator line Lc, and the outermost-side circumferential grooves 5S, 5S located on outermost sides in the tire width direction of the five circumferential grooves 5 provided to extend in the tread circumferential direction of the tread 4 are located within the width W in the tire width direction of the belt layers 3.

Figure 6:
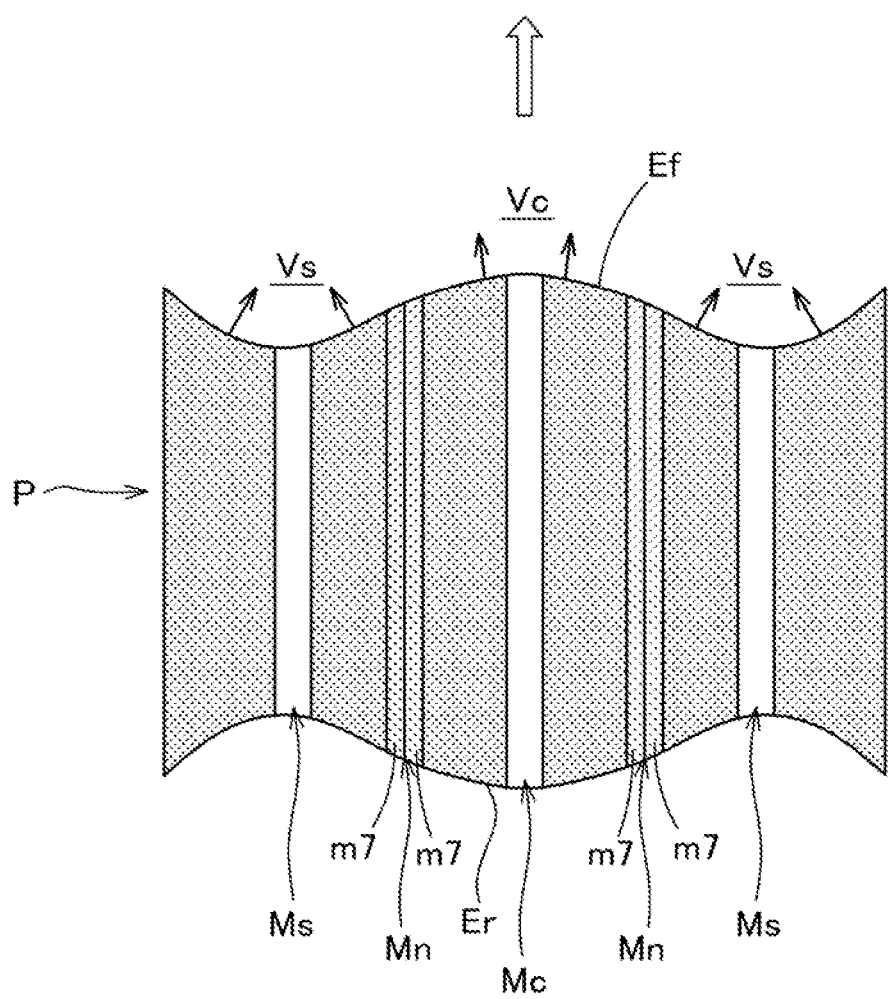
FIG. 6 is a figure depicting a footprint of the pneumatic tire.

Since the pneumatic tire 1 has such a configuration, a footprint P when the tire is a new article is a typical butterfly shape as depicted in FIG. 6, such that a footprint upon traveling growth becomes a rectangular shape.

In the footprint P, there are printed equator circumferential groove mark Mc corresponding to the equator circumferential groove 5C on the tire equator line Lc of the tread 4 of the pneumatic tire 1, outermost-side circumferential groove marks Ms, Ms corresponding to the outermost-side circumferential grooves 5S, 5S located on the outermost sides in the tire width direction, and inner adjacent circumferential groove marks Mn, Mn corresponding to the inner adjacent circumferential grooves 5N, 5N located on the tire width-direction inner sides of and adjacent to the outermost-side circumferential grooves 5S.

Since the raised-row-shaped projection 7N in the inner adjacent circumferential groove 5N is formed at a shallow position near the tread surface 6f, the raised-row-shaped projection 7N is grounded, so that a mark m7 of grounding of the raised-row-shaped projection 7N is formed in the inner adjacent circumferential groove mark Mn.

As illustrated in FIG. 6, the footprint P when the tire is a new article is in a butterfly shape as a whole, where the front-rear direction lengths of the equator circumferential groove mark Mc and the marks of both outer side parts of the tire are the longest, the front-rear direction length of the outermost-side circumferential groove mark Ms therebetween is the shortest, and the front-rear direction length of the inner adjacent circumferential groove mark Mn is an intermediate length between the front-rear direction length of the equator circumferential groove mark Mc and the front-rear direction length of the outermost-side circumferential groove mark Ms.

Attendant on the traveling of the tire, the outside diameter of the outermost-side circumferential groove is the fastest in traveling growth; therefore, the outermost-side circumferential groove mark Ms is enlarged in length, so that the foot print becomes a rectangular shape, being averaged in the tire width direction.

When the vehicle travels on a wet road surface, a front end edge (corresponding to a front end edge Ef of the footprint) of a tire grounding surface acts to drive water forward (outline arrow).

Therefore, when water is driven to the front side of the wavy front end edge Ef of the footprint P in the butterfly shape when the tire is a new article, water is most liable to collect in left and right recesses Vs located at the outermost-side circumferential groove marks Ms, and water is also liable to collect on the front side Vc of a central projection located at the equator circumferential groove mark Mc.

If the thus collecting water is not drained, wet grip performance would be lost, and a hydroplaning phenomenon would be generated.

The water at the recesses Vs where the outermost-side circumferential groove marks Ms are located and water is most liable to collect is drained by the outermost-side circumferential grooves, and, therefore, the outermost-side circumferential grooves are required to have a high drainage property.

On the other hand, water is not liable to collect at the parts where the inner adjacent circumferential groove marks Mn between the outermost-side circumferential groove mark Ms and the equator circumferential groove mark Mc are located, and, therefore, the inner adjacent circumferential grooves are not required to have a high drainage property.

In the pneumatic tire 1, as depicted in FIG. 3, the raised-row-shaped projection 7S in the outermost-side circumferential groove 5S located on the outermost side in the tire width direction of the circumferential grooves 5 is formed at an intermediate depth position of the groove between the tread surface 6f and the groove bottom. When the rib-shaped land parts 6 are grounded, therefore, the mutually opposed raised-row-shaped projections 7S, 7S contact and support each other, whereby deformation of the rib-shaped land parts 6 is restrained, and an increase in rolling resistance is restrained. In addition, the outer-side groove space 5So is formed on the outer circumferential side of the raised-row-shaped projections 7S, 7S while having sufficient internal volume, providing a high drainage property, whereby the water collecting on the front side of the outermost-side circumferential groove mark Ms can be drained efficiently, and the wet grip performance can be kept high.

On the other hand, as illustrated in FIG. 4, the raised-row-shaped projections 7N in the inner adjacent circumferential groove 5N located on the tire width direction inner side of and adjacent to the outermost-side circumferential groove 5S is formed at a shallow position near the tread surface 6f of the groove between the tread surface 6f and the groove bottom. When the rib-shaped land parts 6 are grounded, therefore, the mutually opposed raised-row-shaped projections 7N, 7N contact and support each other, to restrain an increase in rolling resistance. In addition, in the inner adjacent circumferential groove 5N, the raised-row-shaped projections 7N, 7N are formed at a shallow position, so that a drainage property is not high; however, since water is not liable to collect on the front side of the inner adjacent circumferential groove mark Mn, a required drainage property is secured. In addition, it is highly possible for the raised-row-shaped projections 7N, 7N formed at a shallow position near the tread surface to be grounded, so that improved wet grip performance can be realized through an enlarged grounding area.

In the pneumatic tire 1, as depicted in FIG. 2, as the raised-row-shaped projection 7N in the inner adjacent circumferential groove 5N, the plurality of the raised-row-shaped projections 7N are formed at intervals in the tread circumferential direction; therefore, a communication space for providing communication between the outer-side groove space 5No and the inner-side groove space 5Ni is present between the raised-row-shaped projections 7N, 7N adjacent to each other in the circumferential direction, whereby a drainage property is improved. The water present on the front side of the inner adjacent circumferential groove mark Mn is drained, the water is somewhat restrained from flowing toward the outermost-side circumferential groove, whereby burden in drainage by the outermost-side circumferential groove is alleviated, drainage is effectively shared, and the wet grip performance as a whole can be improved.

In addition, the raised-row-shaped projection 7S in the outermost-side circumferential groove 5S is formed at an intermediate depth position of the groove between the tread surface 6f and the groove bottom, so that the outer-side groove space 5So on the outer circumferential side of the raised-row-shaped projection 7S can be secured to be large in internal volume, whereby a high drainage property is maintained.

Besides, as illustrated in FIG. 2, the raised-row-shaped projection 7S in the outermost-side circumferential groove 5S is formed continuously in the tread circumferential direction. When the rib-shaped land parts 6 are grounded, therefore, the mutually opposed raised-row-shaped projections 7S, 7S contact each other continuously and support each other firmly, whereby deformation of the rib-shaped land parts 6 can be restrained as much as possible, and an increase in rolling resistance can be restrained securely.

As depicted in FIG. 5, the raised-row-shaped projection 7C in the equator circumferential groove 5C is formed at an intermediate depth position of the groove between the tread surface 6f and the groove bottom. When the rib-shaped land parts 6 are grounded, therefore, the mutually opposed raised-row-shaped projections 7C, 7C contact and support each other, whereby deformation of the rib-shaped land parts 6 can be restrained, and an increase in rolling resistance can be restrained. In addition, the outer-side groove space 5Co on the outer circumferential side of the raised-row-shaped projections 7C, 7C has a sufficient internal volume, which ensures a high draining property, so that the water collecting on the front side of the equator circumferential groove mark Mc is efficiently drained, and the water is restrained from flowing toward the inner adjacent circumferential groove 5N and the outermost-side circumferential groove 5S. Consequently, burden in drainage by the outermost-side circumferential groove 5S can be alleviated, drainage is effectively shared, and the wet grip performance as a whole over the entire region in the tire width direction can be improved.

Besides, as illustrated in FIG. 2, the raised-row-shaped projection 7C in the equator circumferential groove 5C is formed continuously in the tread circumferential direction. When the rib-shaped land parts 6 are grounded, therefore, the mutually opposed raised-row-shaped projections 7C, 7C contact each other continuously and support each other firmly, whereby deformation of the rib-shaped land parts 6 can be restrained as much as possible, and an increase in rolling resistance can be restrained securely.

Referring to FIGS. 3 to 5, the raised-row-shaped projection 7S in the outermost-side circumferential groove 5S and the raised-row-shaped projection 7C in the equator circumferential groove 5C are formed at deeper positions of the groove on the tire radial direction inner side as compared to the inner circumferential surface 7nb of the raised-row-shaped projection 7N in the inner adjacent circumferential groove 5N.

In other words, as described above, there are the following relations.

Dsa(the depth of the outer circumferential surface 7sa of the raised-row-shaped projection 7S)>Dnb(the depth of the inner circumferential surface 7nb of the raised-row-shaped projection 7N)

Dca(the depth of the outer circumferential surface 7ca of the raised-row-shaped projection 7C)>Dnb(the depth of the inner circumferential surface 7nb of the raised-row-shaped projection 7N)

Therefore, until wear of the tread surface 6f reaches the raised-row-shaped projection 7N formed at a shallow position of the inner adjacent circumferential groove 5N and further before the raised-row-shaped projection 7N is lost, the inner adjacent circumferential groove 5N is closed with the mutually contacting raised-row-shaped projections 7N, 7N, but the outer-side groove spaces 5So and 5Co are still remaining on the outer circumferential side of the raised-row-shaped projections 7S and 7C in the outermost-side circumferential groove 5S and the equator circumferential groove 5C, so that drainage can be maintained. After the raised-row-shaped projection 7N in the inner adjacent circumferential groove 5N is lost, a groove space is opened in the inner adjacent circumferential groove 5N, and, therefore, drainage can be secured even when the outermost-side circumferential groove 5S and the equator circumferential groove 5C are closed with the raised-row-shaped projections 7S, 7S and the raised-row-shaped projections 7C, 7C.

In other words, from the time when the tire is a new article until the tire is completely worn, drainage property is secured by at least one of the outermost-side circumferential groove 5S and the equator circumferential groove 5C, and the inner adjacent circumferential groove 5N, whereby wet grip performance can be maintained.

In addition, before the raised-row-shaped projection 7N in the inner adjacent circumferential groove 5N is substantially lost by wearing, the rigidity of the rib-shaped land parts 6 is secured by the remaining raised-row-shaped projections 7N, 7N in the inner adjacent circumferential groove 5N in addition to the mutually contacting raised-row-shaped projections 7S, 7S in the outermost-side circumferential groove 5S and the mutually contacting raised-row-shaped projections 7C, 7C in the equator circumferential groove 5C, whereby an increase in rolling resistance can be restrained.

Note that after the raised-row-shaped projection 7N in the inner adjacent circumferential groove 5N is lost, the projection length (height) from the groove bottom of the rib-shaped land parts 6 on both sides of the inner adjacent circumferential groove 5N has become small, and, therefore, the rigidity of the rib-shaped land parts 6 would not be lowered considerably, and an increase in rolling resistance can be restrained appropriately.

In the pneumatic tire 1, the belt layers 3 are configured by stacking only the plurality of inclined belts in which the cords of the belt layers 3 are directed in a direction inclined relative to the tire equator line Lc, and, as depicted in FIG. 1, the outermost-side circumferential grooves 5S, 5S located on the tire width direction outermost sides of the five circumferential grooves 5 extended in the tread circumferential direction of the tread 4 are located within the width W in the tire width direction of the belt layers 3. For this reason, the footprint P when the tire is a new article is a typical butterfly shape as illustrated in FIG. 6.

The configuration according to the present invention in which the raised-row-shaped projection 7S in the outermost-side circumferential groove 5S is formed at an intermediate depth position of the groove between the tread surface 6f and the groove bottom whereas the raised-row-shaped projection 7N in the inner adjacent circumferential groove 5N is formed at a shallow position near the tread surface 6f of the groove between the tread surface 6f and the groove bottom, is most suitable for the pneumatic tire 1 whose footprint when the tire is a new article is a typical butterfly shape. As a result, the effect to efficiently drain the water collecting on the front side of the outermost-side circumferential groove Ms while restraining an increase in rolling resistance and the effect to realize improved wet grip performance through an enlarged grounding area can be produced more remarkably.

In regard of an example of the pneumatic tire having the tread structure of the present embodiment, test results of rolling resistance performance and wet grip performance are set forth in Table 1 as evaluation results upon comparison with Prior Art Examples 1 and 2.

The pneumatic tire (Example) used for the test has a tire size of 315/70R22.5, where the tread is formed with five circumferential grooves aligned in the tread width direction and extended in the tread circumferential direction, and the same raised-row-shaped projections as those of the aforementioned pneumatic tire 1 are provided respectively in the five circumferential grooves.

The pneumatic tires of Prior Art Example 1 and Prior Art Example 2 have the same tire size as that of the Example. In the pneumatic tire of Prior Art Example 1, five circumferential grooves aligned in the tread width direction and extended in the tread circumferential direction are provided, but the circumferential grooves are not provided with raised-row-shaped projections.

Prior Art Example 2 is a pneumatic tire in which the tread is not provided with circumferential grooves.

In regard of the pneumatic tires of Example and Prior Art Examples 1 and 2, performance tests of rolling resistance performance and wet grip performance were conducted, the evaluation results being set forth in Table 1.

TABLE 1

|  | Prior Art Example 1 (five circumferential grooves) (without raised-row-shaped projections) | Prior Art Example 2 (without circumferential grooves) | Example (five circumferential groove) (with raised-row-shaped projections) |
| --- | --- | --- | --- |
| Rolling resistance coefficient RRC (index) | 100 | 111.1 | 107.5 |
| Wet grip index | 100 | 90.9 | 104.2 |

In the rolling resistance test, rolling resistance was measured by a force method according to the international standard ISO 28580.

In the evaluation results of rolling resistance coefficient RRC set forth in Table 1, the measured value of rolling resistance was divided by the load to obtain rolling resistance coefficient RRC, and, using the reciprocal thereof, the rolling resistance coefficient RRC is expressed in terms of index with that of Prior Art Example 1 taken as 100.

As this index value is higher, a smaller rolling resistance is meant.

In wet grip test, wet grip was measured by the passenger car method according to the international standard ISO 15222.

In the evaluation results of wet grip performance set forth in Table 1, the measured value of wet grip is expressed in terms of index with that of Prior Art Example 1 taken as 100.

As this index value is higher, better wet grip performance is meant.

As depicted in Table 1, Prior Art Example 2 with no circumferential grooves showed high tread rigidity due to the absence of circumferential grooves, and showed a rolling resistance coefficient RRC of as high as 111.1; however, since drainage by circumferential grooves cannot be achieved, it showed an extremely small wet grip index of 90.9.

On the other hand, due to the circumferential grooves provided with mutually opposed raised-row-shaped projections, the Example maintained a high tread rigidity, and showed a rolling resistance coefficient RRC of as high as 107.5, showing a reduced rolling resistance.

Note that this rolling resistance coefficient RRC of the Example is naturally lower than the rolling resistance coefficient RRC of Prior Art Example 2 with no circumferential grooves, but is still considerably high.

In addition, in the Example, the raised-row-shaped projection 7S in the outermost-side circumferential groove 5S is formed at an intermediate depth position, while the raised-row-shaped projection 7N in the inner adjacent circumferential groove 5N is formed at a shallow position near the tread surface, and the raised-row-shaped projection 7C in the equator circumferential groove 5C is formed at an intermediate depth position; thus, the circumferential grooves have suitable drainage properties according to their positions in the tire width direction, and are effectively sharing drainage. For this reason, the wet grip index is as high as 104.2, showing improved wet grip performance as well.

This wet grip index of 104.2 of the Example is not only naturally higher than the wet grip index 90.9 of Prior Art Example 2 with no circumferential grooves, but is also higher than the wet grip index of 100 of Prior Art Example 1 having five circumferential grooves without any raised-row-shaped projection, thereby showing improved wet grip performance.

This is considered to be caused by the fact that since, in Prior Art Example 1, circumferential grooves are not provided with any raised-row-shaped projection, when the rib-shaped land parts are grounded, compressive deformation or bending or the like of the rib-shaped land parts would occur, thereby worsening the drainage property of the circumferential grooves.

While the tread structure of the pneumatic tire according to the embodiment of the present invention has been described above, the mode of the present invention is not limited to the above embodiment and includes configurations in which the present invention is carried out in various modes within the scope of the gist of the present invention.

For example, the number of the circumferential grooves is not limited to five, and the present invention is applicable to pneumatic tires which include four circumferential grooves or six or more circumferential grooves.

In addition, while the raised-row-shaped projection in the inner adjacent circumferential groove is formed at a shallow position near the tread surface, the outer circumferential surface of the raised-row-shaped projection may be substantially flush with the tread surface.

Note that the pneumatic tire according to the present invention is provided, at the tread, with a rib pattern in which the rib-shaped land parts are formed by the circumferential grooves, and the rib-shaped land parts may be formed with thin grooves such as sipes for wet grip performance, on-ice braking or the like.

REFERENCE SIGNS LIST

1 . . . Pneumatic tire, 2 . . . Carcass, 3 . . . Belt layer, 4 . . . Tread, 5 . . . Circumferential groove, 5C . . . Equator circumferential groove, 5S . . . Outermost-side circumferential groove, 5N . . . Inner adjacent circumferential groove, 6 . . . Rib-shaped land part, 7C, 7S, 7N . . . Raised-row-shaped projection, 8c, 8s, 8n . . . Groove bottom.

The invention claimed is:

1. A pneumatic tire having a plurality of rib-shaped land parts formed by at least four circumferential grooves extended in a tread circumferential direction, wherein
   raised-row-shaped projections from both opposed side wall surfaces of the rib-shaped land parts adjacent to each other with one of the circumferential grooves therebetween are provided while directed in directions toward each other, the raised-row-shaped projections formed such as to extend in the tread circumferential direction,
   the mutually opposed raised-row-shaped projections have a spacing from a bottom of each of the circumferential grooves, mutually facing tip surfaces of the raised-row-shaped projections being disposed with spacing therebetween such that the tip surfaces contact each other due to elastic deformation of the grounding rib-shaped land parts when the tire is grounded, and
   the circumferential grooves include outermost-side circumferential grooves located on tire width direction outermost sides and inner adjacent circumferential grooves located on tire width direction inner sides of and adjacent to the outermost-side circumferential grooves, the raised-row-shaped projections in each of the inner adjacent circumferential groove being formed at a shallower position of the circumferential groove near a tread surface between the tread surface and a bottom of the circumferential groove as compared to the raised-row-shaped projections in each of the outermost-side circumferential grooves,
   the raised-row-shaped projections in each of the outermost-side circumferential grooves are located at an intermediate depth of the circumferential groove between the tread surface and the groove bottom, and are formed at a deeper position on the groove bottom side as compared to a radial-direction inner circumferential surface of the raised-row-shaped projections in each of the inner adjacent circumferential grooves.

2. The pneumatic tire as claimed in claim 1, wherein the raised-row-shaped projections in each of the inner adjacent circumferential groove are formed in a state of being divided into a plurality of portions at intervals in the tread circumferential direction.

3. The pneumatic tire as claimed in claim 1, wherein the raised-row-shaped projections in the outermost-side circumferential groove are formed continuously in the tread circumferential direction.

4. The pneumatic tire as claimed in claim 1, wherein the circumferential grooves include an equator circumferential groove located at a tire equator line in a tire width direction center, raised-row-shaped projections from both opposed side wall surfaces of the rib-shaped land parts adjacent to each other with the equator circumferential groove therebetween are provided while directed in directions toward each other, and the raised-row-shaped projections in the equator circumferential groove are located at an intermediate depth position of the groove between a tread surface and a groove bottom.

5. The pneumatic tire as claimed in claim 4, wherein the raised-row-shaped projections in the equator circumferential groove are formed continuously in the tread circumferential direction.

6. The pneumatic tire as claimed in claim 4, wherein the raised-row-shaped projections in the equator circumferential groove are formed at a deeper position on the groove bottom side as compared to a radial-direction inner circumferential surface of the raised-row-shaped projections in each of the inner adjacent circumferential grooves.

7. The pneumatic tire as claimed in claim 1, wherein a belt layer is embedded in a tread section formed with the circumferential grooves, the belt layer being configured by stacking only a plurality of inclined belts whose cords are directed in a direction inclined relative to a tire equator line, and the outermost-side circumferential grooves are located at a position within width in tire width direction of the belt layer.

* * * * *